(12) United States Patent
Fitzner

(10) Patent No.: US 7,415,340 B2
(45) Date of Patent: Aug. 19, 2008

(54) METHOD OF AND DEVICE FOR OPERATING WORKING MACHINES

(75) Inventor: Werner Fitzner, Sassenberg (DE)

(73) Assignee: Claas Selbsfahrende Erntemaschinen GmbH, Harsewinkel (DE)

(*) Notice: Subject to any disclaimer, the term of this patent is extended or adjusted under 35 U.S.C. 154(b) by 709 days.

(21) Appl. No.: 10/881,915

(22) Filed: Jun. 30, 2004

(65) Prior Publication Data
US 2005/0004737 A1 Jan. 6, 2005

(30) Foreign Application Priority Data
Jul. 2, 2003 (DE) .............................. 103 29 932

(51) Int. Cl.
A01D 75/18 (2006.01)
G06F 19/00 (2006.01)
(52) U.S. Cl. ..................... 701/50; 701/1; 56/10.2 R
(58) Field of Classification Search ............... 701/50, 701/1; 700/12, 17, 37, 38, 52; 56/10.2 R, 56/10.2 C; 460/1, 6, 7; 400/1, 4, 5, 6; 382/156
See application file for complete search history.

(56) References Cited

U.S. PATENT DOCUMENTS

| 4,527,241 | A | * | 7/1985 | Sheehan et al. ............... 701/50 |
| 5,937,621 | A | * | 8/1999 | Eggenhaus ............... 56/10.2 E |
| 6,205,384 | B1 | | 3/2001 | Diekhans |
| 6,726,559 | B2 | * | 4/2004 | Bischoff ........................ 460/1 |
| 6,863,604 | B2 | * | 3/2005 | Behnke ........................ 460/6 |

FOREIGN PATENT DOCUMENTS

EP 0 928 554 A1 7/1999

* cited by examiner

Primary Examiner—Tan Q Nguyen
(74) Attorney, Agent, or Firm—Michael J. Striker

(57) ABSTRACT

A method of operating working machines with a changeable nominal value of at least one specific parameter of a working machine has the steps of forming by the changed nominal value an actual value of the specific parameter of the corresponding working machine; and deriving from the change of the respective actual value of a plurality of working machines a pronounced user behavior; and a device provided for performing the method.

24 Claims, 4 Drawing Sheets

METHOD OF AND DEVICE FOR OPERATING WORKING MACHINES

BACKGROUND OF THE INVENTION

The present invention relates to a method of and device for operating working machines.

A plurality of systems are known from the prior art, that support the operator of working machines, in particular agricultural working machines, during the adjustment of optimal operational parameters of the working machine. For example, the patent document EP 0 928 544 is known, in which a system for machine adjustment is disclosed and operates so that, depending on the various constellations, operational parameters of working elements of the agricultural working machine which are optimal for outer harvesting conditions are determined, they are stored, and depending on the performance, the adjustment of these parameters on corresponding working elements is performed.

For determination of these optimized operational parameters, the system operates through diverse known sensor systems, which determine within the working machine efficient parameters such as grain loss and performance, and with consideration of outer boundary conditions generates from them, in an evaluation and computation unit, optimized operational parameters for the working elements of the agricultural harvester. The effect of such a system, in addition to other features, is increased, since the optimized parameters and the associated outer boundary conditions can be stored in a working machine in data sets, which can be retrieved by operators of other working machines. Thereby the optimization process of the operational parameters of the other working machines can be accelerated.

Such systems however have the disadvantage that the operator which wants to go back to a generated data set must first make a choice, which data set available to him is usable for a concrete operation case. This depends in particular on the experience of the corresponding operator of the agricultural working machine and is in particular difficult when the boundary conditions related to the corresponding optimized parameters deviate from the outer boundary conditions of the concrete application case.

In the most favorable case, it can lead to the situation that the operator of an agricultural working machine, despite taking hold of already optimized machine parameters, due to the deviating outer boundary conditions does not reach a satisfactory optimization of its operational parameters, so that he is forced to rely on its experience to carry out an independent optimization of the operational parameter of its working machine. Such adjustment steps can be however very time consuming, since in the agricultural working machines, a plurality of operational parameters having mutual influences have to be adjusted, and the adjusting regions of the individual operational parameters partially have very great band widths.

SUMMARY OF THE INVENTION

Accordingly, it is an object of the present invention to provide a system for optimization for parameter adjustments on working machines, which eliminates the disadvantages of the prior art and allows a fast and thereby efficient optimization process of operational parameters of a working machine.

In keeping with these objects and with others which will become apparent hereinafter, one feature of the present invention resides, briefly stated, in a method of operating working machines with a changeable nominal value of at least one specific parameter of a working machine, comprising the steps of forming by the changed nominal value an actual value of the specific parameter of the corresponding working machine; and deriving from the change of the respective actual value of a plurality of working machines a pronounced user behavior.

Another feature of the present invention resides, briefly stated in a device for operating working machines with a changeable nominal value of at least one specific parameter of the working machines; comprising means for forming by this changing nominal value an actual value of the specific parameter of the respective working machine; at least one input and indicating unit provided on a plurality of working machines for generating data sets; means for transmitting these data sets through a data exchange system to a data bank system, said data bank system generating from these data sets a pronounced user behavior; and means for retrieving the pronounced user behavior through the data exchange system of the input and indicating unit of a plurality of working machines.

Since in a working machine the nominal value of a specific parameter is changeable and this change of the corresponding nominal value is drawn from a plurality of working machines for deriving a pronounced user behavior, the conditions for a fast and thereby an efficient optimization of specific parameters of working machine are provided. This is especially the case since the determination of a pronounced user behavior goes back to optimized parameter adjustments which are already confirmed in a plurality of application cases and not only in a concrete individual case as an optimal parameter adjustment.

In accordance with a preferable embodiment of the invention, the pronounced user behavior in a simplest case can be determined in that the change of the corresponding nominal value of a number of working machines is registered and in addition the frequency of this change is determined.

The quality of the determined pronounced user behavior in accordance with a further embodiment of the present invention can be influenced in that the change of the corresponding nominal value can be determined qualitatively and/or quantitatively. In this case informations can be taken of the pronounced user behavior on the one hand, whose parameters under certain outer boundary conditions to be changed are to be changed in meaningful manner, and on the other hand concrete values or value regions of the determined pronounced user behavior can be preset for the nominal values to be changed.

In a specifically simple manner the change of the nominal value can be determined in qualitative and quantitative manner, when the changed nominal values form so-called actual values, which are assembled in frequency classes of identical or similar actual values, from which then the frequency of the change of the nominal value and its value region are determined. In the simplest case the qualitative change of the nominal value is limited to the registration of the number of changes of the corresponding nominal value while the quantitative determination of the change of the corresponding nominal value is limited to the registration of predetermined regions of the same or similar actual values.

The quality of the determined pronounced user behavior can be improved when for generation of the pronounced user behavior only the changes of the nominal values performed by a driving operator are taken into consideration. The expressing ability of the determined pronounced user behavior can be improved when the change of the nominal value is registered in an event-controlled manner. Thereby each change of the nominal value leads to influencing of the pronounced user behavior to be determined, and this plausibility improves with increase of the input data sets.

For computer-supported determination of the pronounced user behavior and for later use of this user behavior by an operator of other working machines, it is recommended to store the determined frequencies, the parameters of the frequency classes, which include the actual values in addition to the nominal values, as well as the parameters of the inner and outer boundary conditions, as well as to store the parameters of the inner and outer boundary conditions in connected data sets. In the advantageous manner the inner boundary conditions are formed by specific parameters of the working machine and the outer boundary conditions are formed substantially by weather-specific, geographic and harvest specific data.

In an advantageous further embodiment of the present invention, the determined pronounced user behavior is drawn for deriving of general rules, which are transmittable to specific parameters of other working machines under other inner and outer boundary conditions. This leads, in the case of a small number of available input data sets or with failing input data sets for boundary edge conditions, to a higher accuracy of the derived pronounced user behavior. Moreover, it allows to make specific customer profiles for different outer and inner boundary conditions.

In accordance with an advantageous further embodiment of the present invention, the determined pronounced user behavior can be used for generation of basic adjustments for a nominal value for the parameter of the working machine, wherein this basic adjustments can be available for any working machines.

A particular user-friendly utilization of the determined pronounced user behavior is provided that the operator of a working machine can retrieve the basic adjustments depending on relevant inner and outer boundary conditions. This user-friendliness can be further improved in that the nominal values of the specific parameters of the working machine adapted to the concrete application case can be automatically adjusted to the corresponding working units and the basic adjustments can be changeable by the operator of the working machine.

Depending on the application case, the determination of the pronounced user behavior can be performed centralized or decentralized. When for example the optimization of specific parameters between working machines must be performed, which have basically same or similar operations and operate in spacial proximity to one another, such as in so-called machine fleets in agricultural application cases, it is advantageous to limit the pronounced user behavior to these machine circle. In particular, this has the advantage that the determined basic adjustments are determined already significantly more precise to the concrete application case, so that in this way the optimization time can be again reduced.

An especially simple structural design of an arrangement for performing the inventive method is provided when a plurality of working machines have at least one input and indicating unit for generating data sets, and these data sets are transmitted through a data exchange system to a data bank system, wherein the data bank system from these data sets generates a pronounced user behavior, which again is retrievable through the data exchange system by the input and indicating unit of a plurality of working machines.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
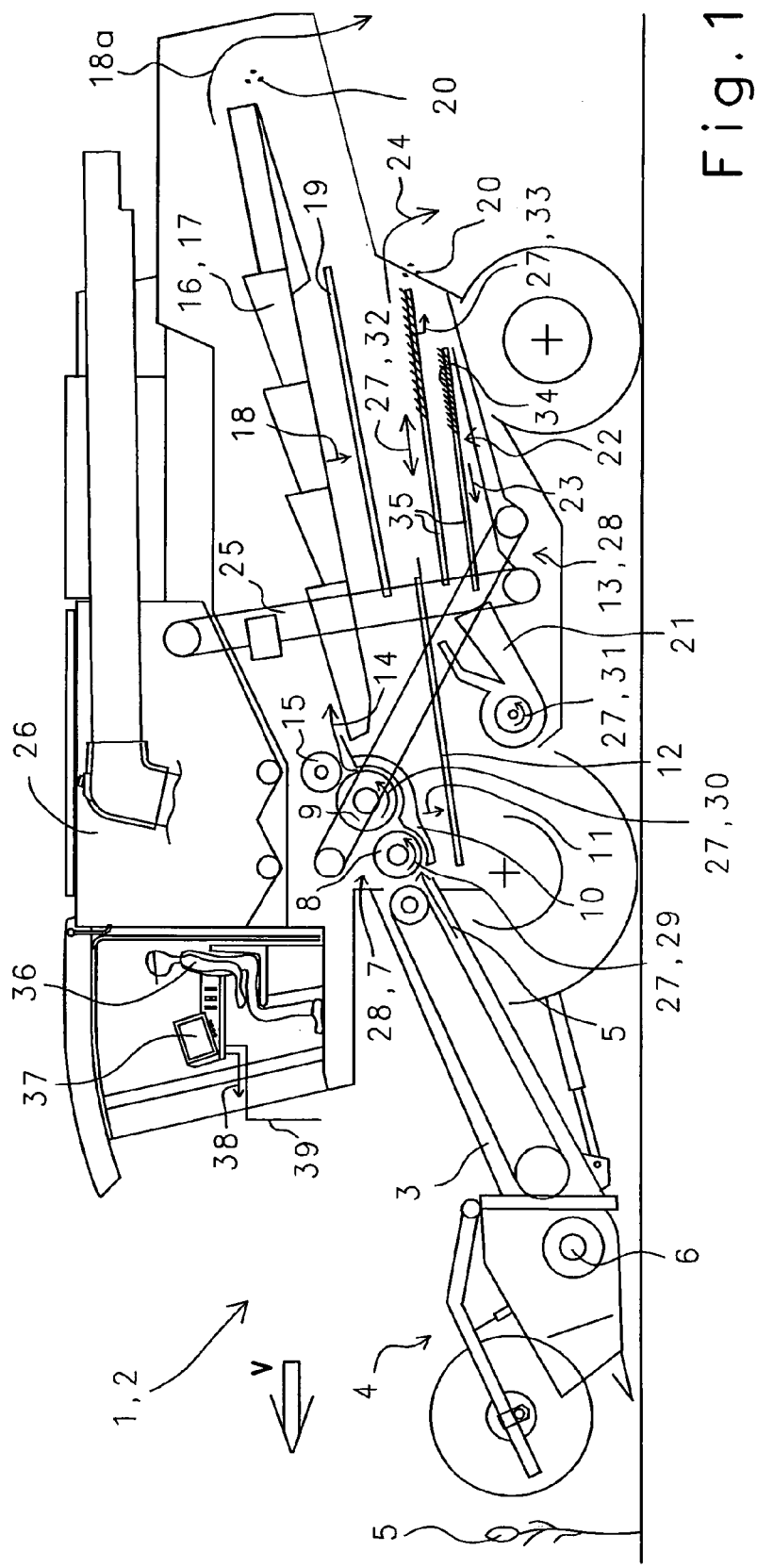
FIG. 1 is a view showing a working machine which is formed as a combine harvester, as well as its working units.

FIG. 1 shows a working machine 1 which is formed as a combine harvester 2. In its front region it has a cutting mechanism 4 arranged on an feed rake 3. It picks the grown crop 5 and supplies it through a transporting element 6 to the feed rake 3. The crop 5 is supplied by the feed rake 3 in a known manner to a threshing unit 7 which is shown as an example and composed of a first threshing drum 8 and a subsequent second threshing drum 9.

In the region of the threshing unit 7, a first product stream 1 which is composed substantially of grains, short straw and chaff is cut on the threshing concave 10 and supplied through a grain pan 12 into a cleaning device 13. A further product stream 14 is transmitted in a rear region of the threshing unit 7 by a beater drum 15 to a separating device 16 formed as a hurdle shaker 17. A further product stream 18 composed substantially of grains, short straw and chaff on the hurdle shaker 17 is transferred through a return pan 19 and a grain pan 12 also to the cleaning device. In addition, a product stream 18a composed substantially of straw and a small fraction of grains, a so-called grain loss 20), is discharged at the end of the hurdle shaker 17 from the combine harvester 2.

In accordance with the present invention the threshing unit 7 and the hurdle shaker 17 can be replaced by not shown generally known axially rotating threshing and separating rotor or only the hurdle shaker 17 by an axially rotating separating rotor.

The product streams 11 and 18 supplied to the cleaning device 13, which is substantially composed of a fan 21 and sieve units 22, is cleaned so that the grain stream 23 composed substantially of grains and a product stream 24 composed substantially of short straw, chaff and a fraction of loss grains 20 are formed. The grain stream 23 is finally transported by conveyor elevators 25 in a so-called grain tank 26 to be stored there.

For providing a high threshing degree of the threshing unit 7 and a low fraction of loss grains 20 with a maximum possible traveling speed v of the combine harvester, various specific parameters 27 of the working unit 28 of the combine harvester 3 are adjustable as will be described herein below. In order to illustrate the invention, the shown example deals only with a substantially specific parameter 27 of the combine harvester 2. A working unit 28 forms a threshing unit 7 composed of threshing drums 8, 9, and the threshing concave 10 partially surrounding them. The specific parameters 27 of the threshing unit 7 are rotary speeds 29, 30 of the threshing drums 8, 9. A further important working unit 28 of the harvester thresher 2 is the cleaning device 13 composed of the fan 21 and the sieve unit 22. The adjustable specific parameters 27 of the cleaning device 13 are the fan rotary speed 31, the vibration frequency 32 of the sieve unit 22, and the sieve opening width 33 of the sieve plates 34 of the individual sieves 35 of the sieve unit 22.

In a known manner, the operator 36 for adjustment of the specific parameters 27, has either not shown adjusting means provided directly on the corresponding working elements 28 or these adjustments can be introduced by an input and indicating unit 27. The direct adjustment of these specific parameters 27 can be provided by the known adjusting means, so that the input and indicating unit 37 generates adjusting signals 38 which are transmitted by a data transmitting system 39 to the adjusting means.

Figure 2:
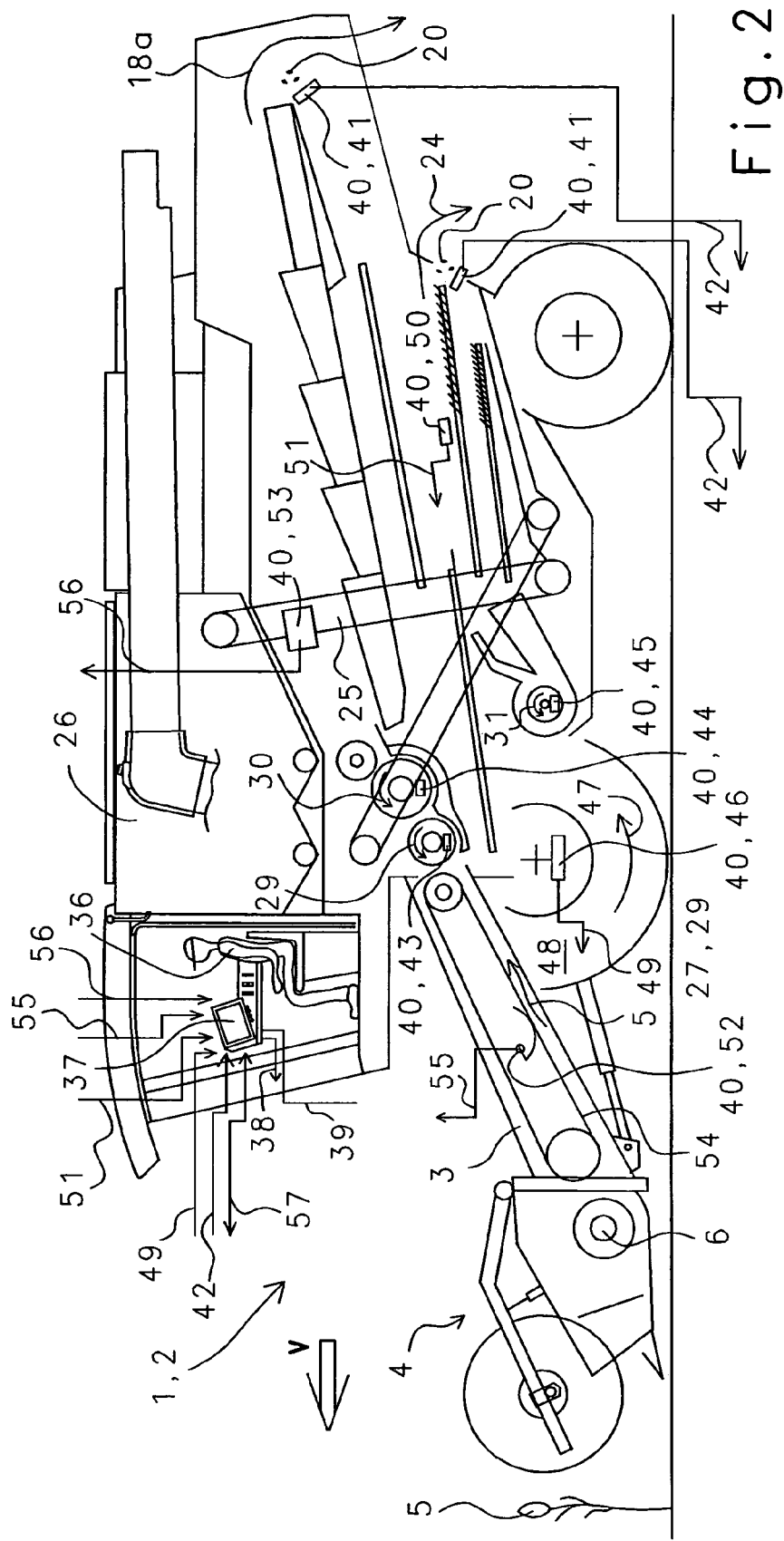
FIG. 2 is a view showing the combine harvester of FIG. 1 with sensor units for determination of specific parameters.

For low grain losses 22 with the adjustable specific parameters 27 and simultaneously allowing the corresponding traveling speeds v adapted to the corresponding performance, the combine harvester 2 shown in FIG. 2 is provided in a known manner with different sensor units 40 which determine, inside the working machine 1, both crop-specific and machine-specific parameters 27, which are then drawn for optimization of the respective specific parameters 27. The sensor units 40 in a simplest case include so-called grain loss sensors 41, which as a rule, from solid born sound produced by the contact of the grains with the grain loss sensors 41, generate a grain loss signals 42 that allow the value-related illustration of the grain loss 20 in the input and indicating device 37.

A further group of sensor units 40 is formed by so-called rotary speed sensors 43-46 which are provided for determination of the threshing drum rotary speeds 29, 30 as well as the fan rotary speed 31 and the traveling speed v. The traveling speed v is determined by determination of the rotary speed 47 of the at least one land wheel 48 of the combine harvester 2. Each of these rotary speed sensors 43-46 generates input signals 49 (for the sake of clarity shown FIG. 1 only for the sensor 46), which in the input and indicating units 37 are computed to real values for the corresponding rotary speeds 29-31 and in some cases are indicated.

In addition, the combine harvester 2 is provided with a sensor unit 50 which can sense the vibration frequency 32 as well as the sieve opening width 33 of the individual sieve 35 of the sieve unit 22. The sensor unit 50 generates input signals 51 for the input and indicating unit 37, that leads in it to indication of real values for the vibration frequency 32 and the sieve opening width 33.

For additionally determining a throughput of product passing through the combine harvester 2, the combine harvester can be provided with so-called throughput sensors or performance sensors 52, 53. One of the throughput sensors 52 is arranged in the region of the feed rake 3 in a known manner, while the throughput sensor 52 determines the crop quantity-dependent deviation of the rotating transporting means 54 and generates from it an input signal 55, which leads in the input and indicating unit 37 to illustration of real values for the total throughput of the crop 5.

The further throughput sensor 53 is formed as a known grain quantity sensor 53 and arranged in the transporting elevator 25 which leads to the grain tank 26. The input signal 56 generated by the corn quantity sensor 53 leads exclusively in the input and indicating unit 37 to showing of a real graine quantity value.

In addition, the combine harvester has a known further data exchange system 57, through which, by means of the input and indicating unit 37, data between the combine harvester 2 and the not shown external systems can be exchanged.

Figure 3:
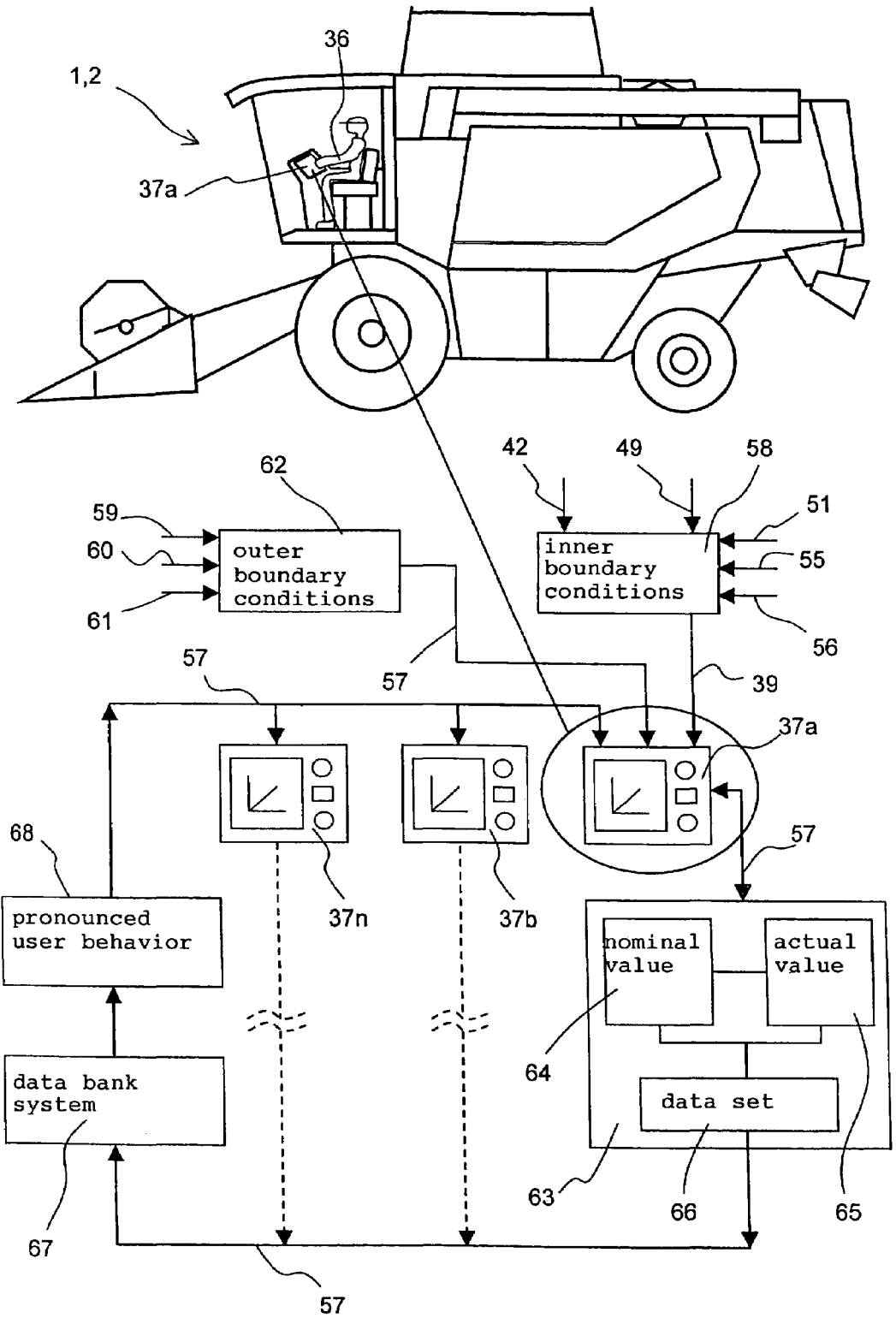
FIG. 3 is a schematic view showing the inventive method in a flow chart presentation.

FIG. 3 illustrates the inventive method schematically in form of a flow chart. For clarity purposes, the input and indicating device 37 integrated in the combine harvester 2 is shown on an enlarged scale. In accordance with previous performances, the input signals 42, 49, 51, 55, 56 generated by the various sensor systems 40 are transmitted through the data transmission system 39 associated with the combined harvester 2, to the input and indicating unit 37. The various input signals 42, 49, 51, 55, 56 represents the specific parameters 27 of the working machine 1, which in the shown embodiment of the machine specific parameters include a threshing drum rotary speeds 29, 30, a fan rotary speed 31, a vibration frequency 32, a sieve opening width 33 as well as the traveling speed v and the crop-specific parameters including a grain loss 20, a crop throughput 55 and a grain throughput 56.

In accordance with the inventive method, these specific parameters 27 represented by the various input signals 42, 49, 51, 55, 56 form the inner boundary conditions 58. In addition, by the operator 36 or by the further data exchange system 57, on the input and indicating unit 37 weather-specific data 59, geographic data 60 over the area in which the combine harvester 2 operates, and crop specific data 61 such as the product moisture, can be determined, which simultaneously represent the inventive outer edge conditions 62.

In a known manner, from these inner and outer edge conditions 58, 62, by means of the input indicating device 37 by the operator 36, an optimization of different specific parameters 27 represented by the corresponding input signals 42, 49, 51, 55, 56 can be provided, wherein the important optimization criteria are low grain loss 20 and a maximum possible speed v which determines the crop throughput 5.

Depending on the inner and outer edge conditions 58, 62, the operator 36 via the input and indicating unit 37 performs more or less frequent changes of various specific parameters 27. For performing the inventive method, it is further required to join a plurality of working machines with corresponding input and evaluating units 27a-n, wherein each input and evaluating unit 37a-n in the above described manner performs an optimization of the specific parameters 27 of the respective working machine 1. Since such optimization processes can be performed in their so-called stationary condition after a predetermined adjusting time, in the input and indicating unit 37 further a module 63 is provided. It registers the change of the nominal value 64 of the specific parameter 27 and from a stationary condition of the specific parameter 27 does not recognize it anymore as changing, wherein the adjusted specific parameters 27 are stored as nominal values 65 of the preliminary adjusted nominal value 64.

After recognizing the stationary condition, the input and indicating unit 37 generate data sets 66, that are composed substantially of the inner and outer boundary conditions 58, 62, as well as the actual value 65 of the specific parameter 27. This data sets 66 are transmitted through the further data exchange system 57 to an external data bank system 67 which then, as will be explained, derives from the received data sets 66 of a plurality of working machines 1 a pronounced user behavior 68, and transmits it in a manner described herein below through the further data exchange system 57 to the input and indicating unit 37a . . . n or retrieves from it.

Figure 4:
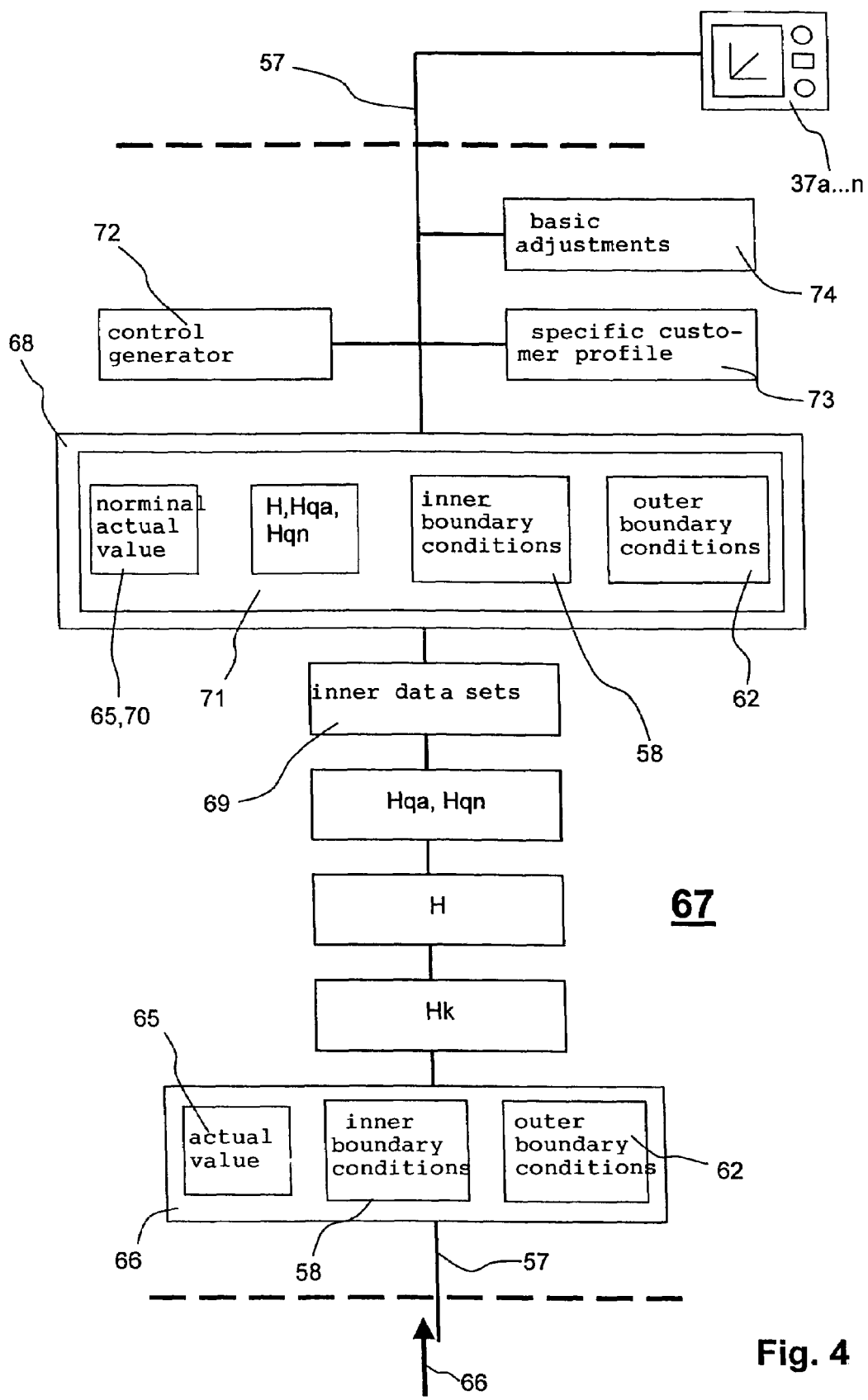
FIG. 4 is a view showing a detail of the flow chart of FIG. 3.

The inventive data bank system 67 shown in FIG. 4 is formed so that, by means of the actual values 65 stored in the data set 66, it registers the change of the nominal value 64 and determines the frequency H of the change. The determined frequency H includes both qualitative and also quantitative data HqaHqn. While the qualitative frequencies Hqa are limited to the registration of the number of the changes of the corresponding nominal value 64 within a predetermined time unit, in the quantitative frequencies Hqn the concrete values or value regions of the changes of the nominal values 64 determined by the actual values 65 are provided. This in particular has the advantage that the pronounced user behaviors 68 to be determined on the one hand contain informations whether nominal values in meaningful way are general and in which orders they are to be changed, for realizing low grain losses 20 and high traveling speeds v with consideration of the various inner and outer boundary conditions 58, 62.

For determining the various frequencies, H, Hqa, Hqn by simple mathematical methods, it is recommended to assemble the actual values 65 of the specific parameters 27 first in frequency classes Hk of equal or similar actual values, and from them then to determine the frequency H of the change of the nominal value 64. For providing the pronounced user behavior 60 to be generated with a higher quality, the data bank system 67 in ideal case processes only the data sets 66 which were generated by a driving operator 36. In addition, the respective input and indicating units 37a . . . n can be formed so that the data sets 66 are generated being event-controlled. In other words only then new data sets 66 are generated, when the actual value 65 of the specific parameter 27 changes due to changing inner and outer boundary conditions 58, 62. Since the outer boundary conditions 62 in agricultural harvesting processes can significantly deviate depending on the time of day, in accordance with a further embodiment of the present invention this event-controlled generation of the new data sets 66 is performed so that always at predetermined day times of day new data sets 66 are generated and less significant changes between these predetermined times are suppressed.

For generating a pronounced user behavior from the data sets 36 transmitted to the data bank system 67 and the determined frequencies H, Hqa, Hqn, internal data sets 69 are generatable and storable in the data bank system 67, and also their parameter, such as the time of day and the actual value 65 of the specific parameter 27 in dependence on the inner and outer boundary conditions 58, 62. From these inner data sets 69, finally the data bank system 67 generates the inventive pronounced user behavior 68, which is formed substantially of the actual values 65, the frequencies H, Hqa, Hqn and the data of the inner and outer boundary conditions 58, 62. The actual values 65 represent now new nominal values 70 for the specific parameters 27 of the working machine 1. In accordance with the present invention the data sets 71 of the pronounced operator behavior 68, in addition to the new nominal values 70, include only a selection of the inner and outer boundary conditions 58, 62 as well as the frequencies, H, Hqa, Hqn.

An especially efficiently operating data bank system 67 is provided when the data bank system is associated with a so-called control generator 72. The control generator 72 derives, from the determined pronounced user behavior 68, general controls which are usable on the specific parameters 27 of the working machines 1, and which are optimized, among others, as inner and outer boundary conditions 58, 62 provided in the data sets 66. This has the advantage that the number of the required data sets 66 for generation of a pronounced user behavior 68 is reduced. In addition, by deriving such general controls, typical application cases can be predefined.

In accordance with an advantageous embodiment of the present invention, the generated pronounced user behaviors 68 can be also drawn for definition of a special customer profile 73, so that the optimization process of specific parameters 27 of a working machine 1 is further shortened. In addition, the determined pronounced user behaviors 68 for generation of a basic adjustment 74 of the nominal values 64 of the specific parameters 27 of the working units 28 are drawn from working machines 1. This also leads to a shortening of the optimization processes of the specific parameters 27 of the corresponding working machine 1.

In accordance with an advantageous further embodiment of the present invention, the basic adjustments 74 of any working machines 1 are retrievable from the data bank systems 67. This retrieval of the basic adjustments 74 can be performed in addition depending on relevant inner and outer boundary conditions 58, 59. In a known manner, such basic adjustments 74 can be performed by the operator 36 of the working machine 1 directly, or, as described, automatically via the input and indicating unit 37 on the corresponding working units 28. A change of these basic adjustments 74 is performed either based on the data sets 66 and the data bank system 67 in the inventive manner, or the operator 36 of the working machine 1 can change the transmitted basic adjustments directly via the input and indicating unit 37.

For making the inventive pronounced user behavior 68 available for global operating working machines 1, it is generated by a centrally arranged data bank system 67 that can be worldwide contacted through suitable data exchange systems 57. If to the contrary the specific parameters 27 must be optimized by working machines 1 operating in a limited territory, the pronounced user behavior 68 can be also generated on the basis of data sets 66 of these working machines 1, so that in this case also a decentralized data bank system 67 considered only in the working machines 1, that operate in this limited territory, can be provided.

It will be understood that each of the elements described above, or two or more together, may also find a useful application in other types of methods and constructions differing from the types described above.

While the invention has been illustrated and described as embodied in a method of and device for operating working machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of operating working machines with a changeable nominal value of at least one specific parameter of the working machines, comprising the steps of forming by a changed nominal value an actual value of the specific parameter of the corresponding working machine; and deriving from the change of the respective actual value of a plurality of the working machines a pronounced user behavior.

2. A method as defined in claim 1; and further comprising determining the change of the respective nominal value in a manner selected from the group consisting of qualitatively, quantitatively and both.

3. A method as defined in claim 1; and further comprising carrying out the change of the actual value by driving operators of the working machines.

4. A method as defined in claim 1; and further comprising registering the change of the actual value of the specific parameter of the working machine controlled by an event.

5. A method as defined in claim 1; and further comprising deriving from the determined pronounced user behavior, general controls by a control generator and transmitting the same to the specific parameters of other working machines under other inner and outer boundary conditions.

6. A method as defined in claim 1; and further comprising using the determined pronounced user behavior for generation of basic adjustments of the nominal value of the specific parameter of the working machine.

7. A method as defined in claim 6; and further comprising making available the determined basic adjustments for any working machines.

8. A method as defined in claim 6; and further comprising retrieving the basic adjustments depending on the relevant inner and outer boundary conditions.

9. A method as defined in claim 8; and further comprising performing automatically a step selected from the group consisting of carrying out the basic adjustments by an operator of a working machine and carrying out their adjustment on the working machine.

10. A method as defined in claim 6; and further comprising providing such basic adjustments which are changeable.

11. A method as defined in claim 1; and further comprising performing a generation of the pronounced user behavior centrally; and providing a plurality of working machines with these centrally generated data.

12. A method as defined in claim 1; and further comprising performing a generation of the pronounced user behavior in a decentralized manner; and providing only a selection of working machines with these decentralized generator data.

13. A method as defined in claim 1; and further comprising using agricultural working machines as the working machines.

14. A method of operating working machines with a changeable nominal value of at least one specific parameter of the working machines, comprising the steps of forming by a changed nominal value an actual value of the specific parameter of the corresponding working machine; deriving from the change of the respective actual value of a plurality of the working machines a pronounced user behavior; and registering the change of the respective nominal value of the at least one specific parameter of a plurality of working machines; and determining a frequency of the change of the respective nominal value.

15. A method as defined in claim 14; and further comprising storing determined frequencies and at least the parameter of the frequency classes depending on both.

16. A method of operating working machines with a changeable nominal value of at least one specific parameter of the working machines, comprising the steps of forming by a changed nominal value an actual value of the specific parameter of the corresponding working machine; deriving from the change of the respective actual value of a plurality of the working machines a pronounced user behavior; and forming by the changed nominal value an actual value; assembling the actual values in frequency classes having same or similar actual values; and from the frequency classes determining a frequency of the change of the parameters of the frequency classes on which the actual values are based, boundary conditions selected from the group consisting of inner boundary conditions, outer boundary conditions, and both, in data set.

17. A method as defined in claim 16; and further comprising forming the parameters of the frequency classes so that they include the corresponding actual values.

18. A method as defined in claim 16; and further comprising selecting the inner boundary conditions so that they include specific parameters of the working machine.

19. A method as defined in claim 16; and further comprising selecting the outer boundary conditions so that they include weather-specific data, geographic data and crop-specific data.

20. A method as defined in claim 16; and further comprising defining the pronounced user behavior by data sets which include the actual values the nominal values determined by the actual values, the frequencies, the parameters of the frequency classes, and the inner and outer boundary conditions.

21. A method of operating working machines with a changeable nominal value of at least one specific parameter of the working machines, comprising the steps of forming by a changed nominal value an actual value of the specific parameter of the corresponding working machine; deriving from the change of the respective actual value of a plurality of the working machines a pronounced user behavior; and performing a qualitative determination of a frequency of the change of the actual value by registering a number of changes of the corresponding actual value.

22. A method of operating working machines with a changeable nominal value of at least one specific parameter of the working machines, comprising the steps of forming by a changed nominal value an actual value of the specific parameter of the corresponding working machine; deriving from the change of the respective actual value of a plurality of the working machines a pronounced user behavior; and performing a qualitative determination of a frequency of the change of the actual value by registering the change of the respective nominal value in regions with identical or similar actual values.

23. A method of operating working machines with a changeable nominal value of at least one specific parameter of the working machines, comprising the steps of forming by a changed nominal value an actual value of the specific parameter of the corresponding working machine; deriving from the change of the respective actual value of a plurality of the working machines a pronounced user behavior; and determining specific customer profiles from the determined pronounced user behavior, with consideration of boundary conditions selected from the group consisting of inner boundary conditions, outer boundary conditions, and both.

24. A device for operating working machines with a changeable nominal value of at least one specific parameter of the working machines; comprising means for forming by a changing nominal value an actual value of the specific parameter of the respective working machine; at least one input and indicating unit provided on a plurality of the working machines for generating data sets; means for transmitting these data sets through a data exchange system to a data bank system, said data bank system generating from these data sets a pronounced user behavior; and means for retrieving the pronounced user behavior through the data exchange system from the input and indicating unit of a plurality of the working machines.

* * * * *